(12) United States Patent
van Vliet

(10) Patent No.: US 8,460,575 B2
(45) Date of Patent: Jun. 11, 2013

(54) FORMULATION FOR GENERATING NITROGEN GAS

(75) Inventor: Laurens Daniël van Vliet, The Hague (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 388 days.

(21) Appl. No.: 12/747,790

(22) PCT Filed: Dec. 5, 2008

(86) PCT No.: PCT/NL2008/050772
§ 371 (c)(1),
(2), (4) Date: Jul. 19, 2010

(87) PCT Pub. No.: WO2009/078707
PCT Pub. Date: Jun. 25, 2009

(65) Prior Publication Data
US 2010/0284888 A1    Nov. 11, 2010

(30) Foreign Application Priority Data
Dec. 14, 2007   (EP) ..................................... 07123289

(51) Int. Cl.
*C01B 21/02* (2006.01)
*C09K 3/00* (2006.01)
*B01J 19/00* (2006.01)
*C06B 35/00* (2006.01)
*C06B 33/00* (2006.01)
*C06B 45/04* (2006.01)

(52) U.S. Cl.
USPC ............ 252/183.14; 252/183.16; 252/183.13; 252/183.12; 149/2; 149/17; 149/18; 149/35; 149/37; 102/292; 422/165; 423/35

(58) Field of Classification Search
USPC .. 252/183.14, 183.16, 183.13, 183.12; 149/2, 149/17, 18, 35, 37; 102/292; 422/165; 423/35
See application file for complete search history.

(56) References Cited

U.S. PATENT DOCUMENTS

| | | | | |
|---|---|---|---|---|
| 3,931,040 A | * | 1/1976 | Breazeale | 149/35 |
| 4,758,287 A | * | 7/1988 | Pietz | 149/2 |
| 4,758,297 A | * | 7/1988 | Calligarich | 156/251 |
| 5,536,339 A | * | 7/1996 | Verneker | 149/19.5 |
| 6,051,158 A | * | 4/2000 | Taylor et al. | 252/67 |
| 2005/0127324 A1 | | 6/2005 | Wu | |

FOREIGN PATENT DOCUMENTS

| | | |
|---|---|---|
| GB | 416586 | 9/1934 |
| WO | WO 01/23327 A1 | 4/2001 |
| WO | WO 03/009899 A1 | 2/2003 |

* cited by examiner

*Primary Examiner* — Joseph D Anthony
(74) *Attorney, Agent, or Firm* — Novak Druce Connolly Bove + Quigg LLP

(57) ABSTRACT

The invention is directed to a solid, porous material, suitable for generating nitrogen gas, said material having a porosity of 20 to 75 vol. %, and a composition comprising, based on the weight of the material of 60 to 90 wt. % of sodium azide, 0.1 to 20 wt. % of an inert chemical coolant based on at least one inorganic salt having a heat capacity of at least 1400 J/K/kg, 0.1 to 20 wt. % of modifying agent selected from metal oxides and metal carbonates, and a binder, selected from the group consisting of at least one alkali metal silicate, preferably waterglass, or a poly-tetrazole, in an amount of between 3 and 15 wt. %.

13 Claims, 1 Drawing Sheet

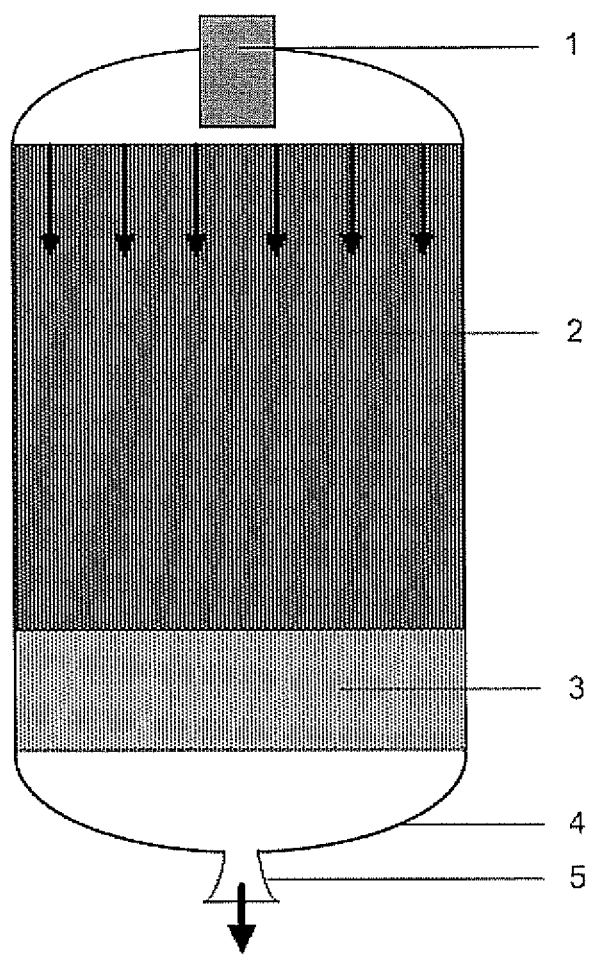

FORMULATION FOR GENERATING
NITROGEN GAS

This application is a national phase application of PCT/NL2008/050772, filed Dec. 5, 2008, which claims priority to European Application No. 07123289.6 filed Dec. 14, 2007, the disclosures of which are incorporated herein by reference.

The present invention is directed to a solid propellant gas generator that can generate cool and if necessary very pure nitrogen gas by decomposing a nitrogen gas generating solid material under controlled conditions.

There are many applications where there is a need for a source that supplies large quantities of relatively pure or even pure, and cool gas on demand. Nitrogen, in this respect, is a good inert gas for many applications. Gas supply bottles have certain disadvantages: they are relatively bulky and heavy and they have to be checked at regular intervals whether there is still sufficient pressure in the bottles.

Therefore, it can be of interest to have an alternative source for nitrogen gas that is less bulky and lighter and does not require frequent monitoring. One solution is a solid propellant gas generator. This is a device in which a solid material (also called "propellant") decomposes into nitrogen and slag material; the latter is retained in the housing of the gas generator.

Typical particularly useful applications for such solid propellant gas generators are:
    providing nitrogen to reduce the oxygen concentration in a local atmosphere,
    providing nitrogen mixed with fire suppressing agents,
    providing driver gases for fire extinguishers,
    providing gases for explosion suppression,
    generation of nitrogen for the dilution of other gases,
    generation of nitrogen gas for pneumatic (emergency) equipment.

In all these cases a nitrogen gas source has to be available that preferably can be stored for long periods (years) without maintenance and that does not cause a hazard for personnel, equipment or the environment.

Early nitrogen gas generators have used traditional organic binders, and special cooling devices (mechanical and chemical) that had the following disadvantages:
    they led to heavy and complicated gas generators,
    they generated many pollutants in the nitrogen.

Such gas generators are less suitable for use as fire extinguishers, devices for explosion suppression, or gas dilution.

Moreover, notwithstanding the mechanical and chemical cooling devices, these classical gas generators still deliver gases of relatively high temperatures.

As for all conventional chemical gas generators, the decomposition temperature is high, the gases have to be cooled. The German patents DE 19903237 and DE 19726296 specifically address means to cool the gases, while U.S. Pat. No. 6,183,008, and the European patents EP 0876943, EP1057514 teach that the filter used to purify the gases also specifically serves to cool the gases. For most chemical gas generators, the size and mass of the filter therefore not only depends on the amount of pollutants to be filtered but also on the temperature of the gases that have to be cooled. These additional devices, or increased-size filters, to cool the gases increase the mass, volume and cost of the gas generator.

It is an object of the present invention to overcome such disadvantages of the prior art and to provide a gas generator that can produce nitrogen gas of low temperature and preferably also of high purity.

The object of this invention is a solid propellant gas generator for providing cool nitrogen gas on command. A further object of the invention is to provide a solid gas generator for the generation of nitrogen gas, on command, at a predetermined rate.

The gas generator that is subject of the present invention further avoids the use of special cooling devices or coolant filters by applying the same technique as disclosed in the Russian patent RU 2108282 and the international patent application WO-A 0123327.

The gas generator of the present invention comprises a charge or gas generating compound contained in a suitable housing, whereby the chemical composition of the charge basically composed of a gas generating compound, sodium azide, $NaN_3$, a binder consisting of at least one alkali metal silicate, preferably waterglass, or a poly-tetrazole, a coolant and a decomposition rate modifier.

In its broadest form, the invention accordingly relates to a solid propellant gas generator that can generate cool (<90° C., preferably <40° C.) and preferably very pure nitrogen by decomposing a porous solid nitrogen gas generating material under controlled conditions.

The invention resides in particular in the specific composition of the nitrogen generating material, which composition is based on a balanced combination of components, in specific amounts, leading to the generation of clean nitrogen of low temperature, at rates that can be varied by varying the composition of the material.

Specifically, the present invention is concerned with a solid, porous material, suitable for generating nitrogen gas, said material having a porosity of 20 to 75 vol. %, and a composition comprising, based on the weight of the material of 60 to 90 wt. % of sodium azide, 0.1 to 20 wt. % of an inert chemical coolant based on at least one inorganic salt having a heat capacity of at least 1400 J/K/kg, 0.1 to 20 wt. % of modifying agent selected from metal oxides and metal carbonates, and a binder, selected from the group consisting of at least one alkali metal silicate, preferably waterglass, or a poly-tetrazole, in an amount of between 3 and 15 wt. %.

An important aspect of the invention is the porosity of the solid nitrogen gas generating material. The material has a porosity of 20 to 75 vol. %, which porosity is homogeneously distributed in the solid material (charge), thereby enabling the generated gas to pass through the pores of the solid material.

Although one deals with exothermal reactions, the gas generator delivers cool gases; in most cases the temperature of the delivered gases is lower than 40° C., but always lower than 90° C.

The composition of the gas generating charge may be varied within the limits indicated to provide the required properties of the gas, such as purity, rate and temperature. More in particular, the amount of binder may be varied depending on the required porosity or required mechanical strength, which in turn influence temperature and rate of nitrogen production. Further the amount of coolant also influences the decomposition rate. On the other hand, higher amounts of coolant may lead to reduced nitrogen production.

As nitrogen generating agent sodium azide is used. This decomposes into nitrogen gas and metallic sodium. In order to prevent this sodium (or reaction products thereof, such as with water) to be present in the final nitrogen gas it is possible to use a filter for the gas and/or to include neutralising means, as will be explained below.

An important component of the composition is the specific binder. The use of a binder in the prior art compositions is generally based on a compromise in properties. It is important that the binder has strong binding properties, so that it can be used in small amounts, thereby not generating too much contamination compounds in the final gas. Most prior art binder, however, either are relatively harmless, but need to be used in large amounts, thereby diluting the nitrogen, often to below acceptable levels, or they can be used in relatively low amounts, but generate rather dangerous contaminants, which are unacceptable in the gas, even at low levels.

In the present invention, it has been found that in the combination of the specific binders and modifiers, with sodium azide, a properly functioning gas generating composition is obtained, that meets the above criteria.

The solid, but porous charge further contains a coolant. This coolant is an inert chemical coolant and is selected from the group of inorganic salts. The heat capacity of the coolant should be at least 1400 J/K/kg determined at 600 K in order to provide sufficient cooling. Further, the coolant has an important function as slag modifier. Because of its properties it helps keeping the slag, after the functioning of the gas generator, in place. The coolant should be inert, which means that it does not decompose or react with the other components in the charge, at the reaction temperature of the gas generation. In a preferred embodiment the heat capacity is at least 1900 J/K/kg.

In addition to the required heat capacity, as defined herein, the coolant must also meet the requirement that it is inert, i.e. that it does not decompose at the temperature of the gas generation, such as at 600K. This means that hydroxides and carbonates cannot be used herein, as they are unsuitable.

The coolant preferably comprises one or more compounds selected from $LiF$, $Li_2O$, $Li_2C_2$, $Li_3N_3$, $Li_2SO_4$, $Li_2B_2O_4$, $Li_2B_4O_7$ and $Li_2SiO_3$. Preferred are the lithium compounds in view of the superior combined properties in relation to slag modifier and coolant.

As a further essential component, the charge contains a modifying agent, more in particular a burning modifier, selected from metal oxides and metal carbonates. Generally, these modifying agents do not have the high heat capacity of the cooling agent. Further, the modifying agent either reacts exothermically in the system, or has a catalytic function.

As modifying agent preferably ferric oxide ($Fe_2O_3$) or sodium carbonate ($Na_2CO_3$) are used.

As indicated above the specific combination of all components leads to a gas generator having well balanced properties, which may be fine tuned to meet the requirements of the specific use, such as indicated earlier.

The solid gas generating material is in the form of one or more porous charges having a porosity of 20 to 75 vol. %. In case of more than one gas generating charge, the first charge is initiated by means of an ignition device (igniter); the other charges are ignited successively by the preceding charge or charges. The reaction (decomposition) front moves at controlled speed away from the igniter while the hot decomposition gases pass through the porous charge or charges, thereby exchanging heat with the charge or charges so that the charge or charges warm up and the gases cool down to the initial charge temperature.

The charge or charges have been manufactured separately and are mounted into the housing of the gas generator in such a way that the majority of the generated gas, preferably more than 90%, more in particular more than 95% of the decomposition gases pass through the pores of the porous charge or charges.

The charge or charges may have a composition that changes over the length and or width of the charges.

The gas generator may further contain a secondary charge that allows to generate decomposition products to neutralize the slag of the primary gas generating porous charge or charges, preferably gaseous sulphur, to neutralise the sodium (or reaction products thereof) produced by the decomposition.

The igniter may be of a classical pyrotechnic type, but it is also possible to use other (conventional) igniters.

The (first) charge is ignited at that location of the charge that is away from the gas generator outlet. The ignition takes place at the top of the first porous charge. In this way, the housing forces the hot inert decomposition gases to pass through the solid porous charge or charges. Thereby the generated gases cool down, while the charge or charges are being heated. By raising the temperature of the porous charge or charges, a controlled decomposition is maintained. At the exit of the last charge the gases generally have attained the (initial) temperature of the last porous charge and completely exchanged their heat with the unburned sections of the charges.

To assure that the gas generator does not discharge sodium (or reaction products thereof) and that the gases do not contain particulate material or unwanted chemical pollutants, the gas generator may be provided with a special filter that filters out sodium and any other unwanted pollutant and solid or liquid material. Suitable filters comprise granular material, such as activated carbon, sand, zeolite, metal oxides, and combinations thereof, either in admixture with each other or consecutively.

An important aspect of the gas generator of the type of the present invention, compared to airbag formulations, resides in the need to obtain a stable burning behaviour, instead of the explosion type decomposition of an airbag formulation. Further there is a need for a low pressure and a low gas load (of the filter, if present).

In this aspect the coolant had the main function of cooling the produced gases in the part of the charge (grain) that is not yet decomposed. Further, it keeps the liquid reaction products in place, which reduces the filter load.

Preferably the gas generator delivers inert gases with a nitrogen content of at least 85%, preferably at least 95%. In the case of very clean nitrogen it is preferred that the gas contains flammable or combustible gases in concentrations far below their lower flammability limit in air, and preferably the concentration of methane is lower than 0.2 volume %, the concentration of hydrogen is lower than 1.0 volume %, the concentration of carbon monoxide is lower than 0.02 volume %, the concentration of ammonia in the discharged gases is preferably lower than 0.05 volume %.

Typical applications for the gas generator according to the invention are:
providing driver gas for fire extinguishers,
providing driver gas for explosion- or fire-suppression,
generation of nitrogen for the dilution of other gases,
generation of gas for pneumatic (emergency) equipment.
inflation of airbags.

Other possible applications are:
inflation of bags to lift heavy loads or heavy equipment,
inflation of inflatable boats,
providing nitrogen to power actuators,
provide a stream of high velocity gas,
provide a flow of gas for the dispersion of powder, liquid sprays (e.g. paint) or to transport material.

The invention will now be described with the help of a FIGURE, wherein the general lay-out of a gas generator of the invention is shown.

It is to be noted that the following description is not limited to the specific embodiments of the FIGUREs, as these FIGUREs are presented mainly as an aid to understanding the invention and the preferred embodiments thereof.

The gas generator is described with the help of the FIGURE. It contains an igniter (1), and one or more porous, gas generating charges (2). It is essential that this charge or charges are porous, allowing the decomposition gases to pass through this charge or these charges. Furthermore, the gas generator may contain one or more filters (3). The gas generator has a housing (4), a vent (5) and it may have a second igniter; this igniter is optional. Moreover the gas generator may have a neutralizing charge; this neutralizing charge is also optional.

The charge may have any suitable shape, be of a smaller diameter than the main charge or be perforated, although this is not preferred. Also layouts are possible where the neutralizing charge is ignited (with some delay) by the main igniter.

The igniter (1) ignites the main gas generating charge (2). The igniter can be of any suitable classical pyrotechnic type if there is no severe requirement on the purity of the gases that are delivered by the gas generator. The igniter may comprise an initiator, which may either be an electrical one, a percussion activated initiator or an initiator that is laser ignited.

The main gas generating charge may be of different shapes or may consist of stacks of charges of suitable shapes.

Each stack may also be of a different composition as to modify the burning rate or the composition of the gas, and/or the composition may vary over the length and or the width of the charge.

In the FIGURE, the charges are cylindrical; this results in a rather constant mass flow rate of the produced gases. However, by making the charges in the shape of a (truncated) cone, two truncated cones, spherical or of other suitable shapes, the mass flow rate of gas may be pre-programmed for its specific application. The hot gas passes through the porous charge or charges, thereby exchanging its heat with the initial (virgin) cool charge material and cooling the gas.

The decomposition products may then be passed through a filter, after leaving the charge to purify the gas. A secondary function of the filter is to cool down the gas that is generated by the very last portion of the last porous charge.

The charges may be cast in the container but may also be cast separately and mounted in the housing later, optionally using a liner.

The layout of the gas generator is such that the decomposition gases always pass through the porous charge (2) thereby exchanging their heat with the main charge. Any bypassing of the charge is generally avoided, either by proper sealing, or because the charge is bonded or case-bonded to the housing or has a tight fit within the housing. This serves two purposes:

the decomposition gases are cooled to ambient temperature, while the charge is heated to sustain the decomposition reaction.

The decomposition rate of the charge is modified by adding small amounts of burn rate modifiers selected from metal oxides and metal carbonates, such as iron oxide ($Fe_2O_3$) or sodium carbonate ($Na_2CO_3$). Controlling the decomposition rate is important to control the generated mass flux, but also to ensure a stable progress of the decomposition front and to ensure stable combustion. For instance, the Table below shows the effect of $Fe_2O_3$ on the decomposition rate of a typical $NaN_3$ (79 wt %), LiF (10-13 wt %), K-silicate (waterglass; 7 wt. %) charge, having a porosity of 50%:

| Amount of $Fe_2O_3$ (wt %) | Effect on decomposition rate of the charge |
| --- | --- |
| 1 | r_ref |
| 2 | 1.42*r_ref |
| 3 | 1.67*r_ref |
| 4 | 2.08*r_ref |

The porosity of the charge preferably is near 50%. The primary gas source is sodium azide ($NaN_3$), lithium fluoride is the coolant and K-silicate (waterglass) is the binder. Good performance can be achieved with charge compositions that lie within the following preferred ranges:

| | | |
| --- | --- | --- |
| Nitrogen generating compound | sodium azide, $NaN_3$ | 60%-90% |
| Binder | K-silicate (waterglass), $K_2SiO_3$ | 3%-15% |
| Inert coolant | lithium fluoride, LiF | 0.1%-20% |
| Decomposition modifier | Iron Oxide, $Fe_2O_3$ | 0.1-20% |
| Porosity | | 20%-75% |

In addition to or instead of lithium fluoride (LiF) as a coolant, other coolants may be used, especially $Li_2O$, $Li_2C_2$, $Li_3N_3$, $Li_2SO_4$, $Li_2B_2O_4$, $Li_2B_4O_7$ and $Li_2SiO_3$ are possible coolants. They are used in weight percentages ranging between 0.1% and 20% of the total charge mass. In addition to or instead of iron oxide ($Fe_2O_3$) other modifying agents may be used, selected from metal oxides and metal carbonates.

The coolant properties of the various preferred coolant materials are set forth in the following table:

| Coolant | Heat Capacity @ 600 K [J/K/kg] |
| --- | --- |
| LiF | 1994 |
| $Li_2O$ | 2518 |
| $Li_2C_2$ | 2632 |
| $Li_3N$ | 3052 |
| $Li_2SO_4$ | 1544 |
| $Li_2B_2O_4$ | 1728 |
| $Li_2B_4O_7$ | 1418 |
| $Li_2SiO_3$ | 1487 |

After decomposition of the sodium azide, (pure) sodium remains in the slag of the charge. With water that is always present in the atmosphere, sodium may form sodium hydroxide and hydrogen in a heat generating reaction. To neutralize this sodium, and to prevent the formation of NaOH and $H_2$, a neutralizing charge may be incorporated in the gas generator. This neutralizing charge may consist of a gas generating composition together with an effective neutralizer, for instance sulfur.

Results of experiments and chemical analysis of charges according to a preferred composition confirm the purity of the generated gases:

The results of the gas analysis (average values):

| Component | Gas Generator output [vol. %] |
| --- | --- |
| Nitrogen | >98 |
| Hydrogen | 0.7 (7000 ppm) |

-continued

| Component | Gas Generator output [vol. %] |
|---|---|
| Methane | 0.017 (170 ppm) |
| Carbon monoxide | 0.0001 (1 ppm) |
| Carbon dioxide | 0.0005 (5 ppm) |
| Ammonia | 0.0113 (113 ppm) |
| Water | 0.22 (2200 ppm) |

In all cases the gas generator generates nitrogen gas containing more than 98% $N_2$.

Not only to prevent the discharge of sodium from the gas generator, but also to increase the purity of the gases delivered by the gas generator, a chemical filter (3) may be placed between the porous charge and the exhaust.

The filter may also contain inert materials like sand, paper, glass fiber, zeolites or metal mesh material to filter out any fine droplets and particulate material. The filter will also cool the gases towards the end of the gas generator functioning when the remainder of the charge has too small a heat capacity to cool the very last portion of the generated gases.

The invention claimed is:

1. A solid, porous nitrogen gas generating material having a porosity of 20 to 75 vol. %, and comprising, based on the total weight of the material:
   60 to 90 wt. % of sodium azide,
   0.1 to 20 wt. % of an inert chemical coolant based on at least one inorganic salt having a heat capacity of at least 1400 J/K/kg,
   0.1 to 20 wt. % of modifying agent selected from metal oxides and metal carbonates, and
   3 and 15 wt. % of a binder, selected from at least one alkali metal silicate or a poly-tetrazole.

2. Material according to claim 1, wherein the coolant is selected from LiF, $Li_2O$, $Li_2C_2$, $Li_3N_3$, LiCl, NaCl, $CaF_2$, $Li_2SO_4$, $Li_2B_2O_4$, $Li_2B_4O_7$ and $Li_2SiO_3$.

3. Material according to claim 1, wherein the modifying agent is selected from iron oxide ($Fe_2O_3$) or sodium carbonate ($Na_2CO_3$).

4. Material according to claim 1, wherein said poly-tetrazole is selected from a tetrazole salt of an alkali metal.

5. Material according to claim 1, wherein said alkali metal silicate is a mixture of sodium and potassium silicate.

6. Material according to claim 1, wherein said coolant is an inorganic salt having a heat capacity of at least 1900 J/K/kg.

7. Gas generator, for generating nitrogen gas, comprising:
   a nitrogen gas generating material;
   a housing for the nitrogen gas generating material and;
   an igniter,
   wherein the nitrogen gas generating material is a solid, porous material having a porosity of 20 to 75 vol. %, and comprises, based on the total weight of the material:
   60 to 90 wt. % of sodium azide,
   0.1 to 20 wt. % of an inert chemical coolant based on at least one inorganic salt having a heat capacity of at least 1400 J/K/kg,
   0.1 to 20 wt. % of modifying agent selected from metal oxides and metal carbonates, and
   3 and 15 wt. % of a binder, selected from at least one alkali metal silicate or a poly-tetrazole.

8. Gas generator according to claim 7, further comprising a filter present downstream of the gas generating material.

9. Gas generator according to claim 7, wherein the nitrogen gas generating material is mounted into the housing in such a way that 90% or more of the decomposition gases pass through the mounted gas generating material.

10. Process for generating nitrogen gas, which process comprises:
    providing a gas generator comprising a nitrogen gas generating material, a housing for the nitrogen gas generating material, and an igniter, wherein the nitrogen gas generating material is a solid, porous material having a porosity of 20 to 75 vol. %, and comprises, based on the total weight of the material:
    60 to 90 wt. % of sodium azide,
    0.1 to 20 wt. % of an inert chemical coolant based on at least one inorganic salt having a heat capacity of at least 1400 J/K/kg,
    0.1 to 20 wt. % of modifying agent selected from metal oxides and metal carbonates, and
    3 and 15 wt. % of a binder, selected from at least one alkali metal silicate or a poly-tetrazole,
    igniting the gas generating material in the gas generator to cause decomposition of the nitrogen gas generating material, and
    generating nitrogen from the decomposition.

11. Material according to claim 1, wherein the at least one alkali metal silicate comprises waterglass.

12. Material according to claim 2, wherein the coolant compound is selected from LiF.

13. Material according to claim 4, wherein the tetrazole salt of an alkali metal is selected from sodium poly-5-vinyltetrazole, potassium poly-5-vinyltetrazole, and ammonium poly-5-vinyltetrazole.

* * * * *

UNITED STATES PATENT AND TRADEMARK OFFICE
CERTIFICATE OF CORRECTION

PATENT NO.       : 8,460,575 B2  
APPLICATION NO. : 12/747790  
DATED            : June 11, 2013  
INVENTOR(S)      : Laurens Daniël van Vliet Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Eighth Day of September, 2015

Michelle K. Lee
*Director of the United States Patent and Trademark Office*